April 18, 1967  S. B. TUWINER  3,314,881
WATER EXTRACTION BY FREEZING
Filed July 12, 1963
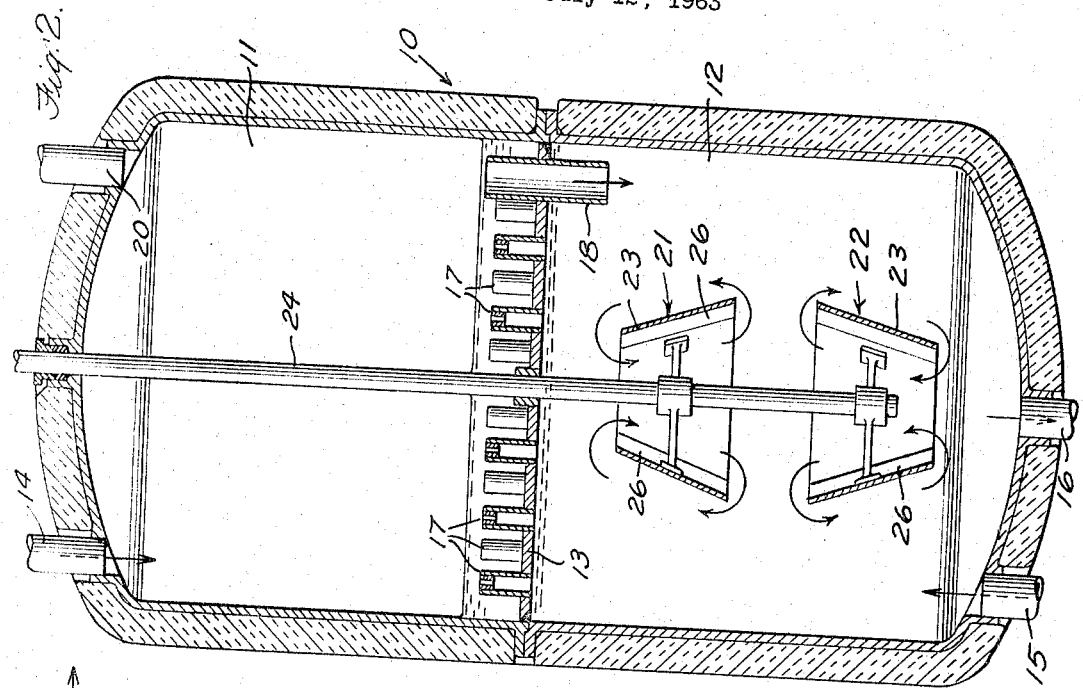
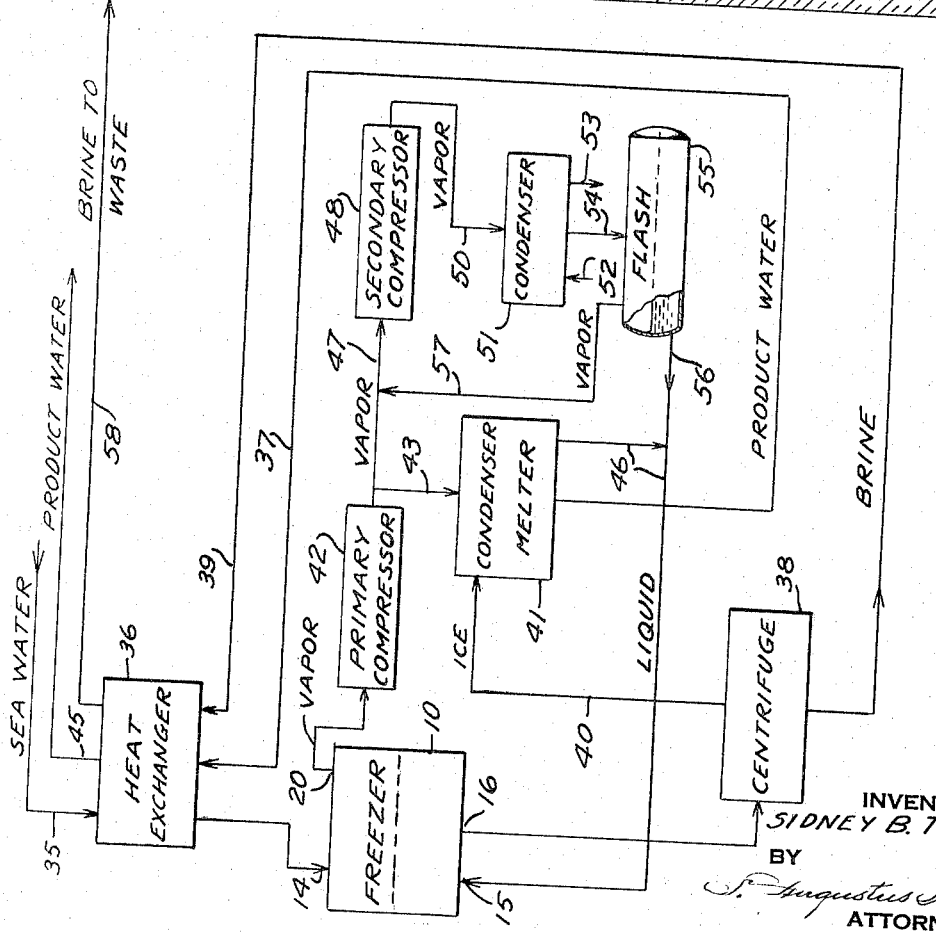
INVENTOR
SIDNEY B. TUWINER
BY
S. Augustus Femma
ATTORNEY

3,314,881
WATER EXTRACTION BY FREEZING
Sidney B. Tuwiner, 8 Lincoln Ave.,
Baldwin, N.Y. 11510
Filed July 12, 1963, Ser. No. 294,581
11 Claims. (Cl. 210—59)

The present invention relates to a process and apparatus for extracting water from an aqueous solution by freezing, and although it has a wide range of utility, as for example, in the concentration of chemical solutions and of foods, such as, citrus juice and milk, it is particularly useful in connection with the desalination of saline solutions.

Various processes are known in which desalination is attained by bringing together into direct contact the saline water and a boiling refrigerant. Heat is transferred from the water to the liquid refrigerant as said refrigerant is converted into vapor, thereby freezing the water. The vapor is compressed and then condensed by heat transfer to the ice after separation of said ice from the saline solution, producing thereby water substantially free from salt.

The capital cost of equipment for desalination by these known processes depends on the size of the reactor or freezer where the saline solution and boiling refrigerant are brought together into direct contact, and the size of this freezer in turn depends on the rate at which ice is produced per unit volume of the freezer. The efficiency of the equipment depends on the heat transfer capacity of the freezer per unit volume of the freezer.

The capital cost of the equipment employed in the known processes also depends upon the size and complexity of the filter, centrifuge or other form of device used to separate the ice from the brine following the freezing operation. In known processes of desalinating brine, the ice particles formed in the freezer are small, light, and snow-like, and are difficult to separate from the brine, thereby adding to the complexity of the separator and to the cost of separation.

One object of the present invention is to provide a new and improved water extraction freezer process, which is comparatively efficient from the standpoint of heat transfer capacity per unit volume of the freezer, and which is comparatively inexpensive in the cost of equipment required to carry out the process.

Another object of the present invention is to provide a new and improved water extraction freezer process for producing comparatively large and uniformly sized ice crystals at a comparatively high rate.

The formation of small ice crystals in the prior art process of desalination is due to the undercooling of the refrigerant in the freezer. When droplets of boiling refrigerant are injected into saline water or brine in a freezer to produce ice therein, there is a tendency to "flash vaporization" resulting from the wide difference between the total static pressure in the freezer and the lower vapor pressure of the substances in the droplets. This flash vaporization causes a nearly adiabatic cooling of the droplets of refrigerant below the mean temperature of the brine, the rapidity of the cooling process being so great, that the transfer of heat from the brine to the droplets of refrigerant is insufficient to avoid substantial undercooling. Although it is possible to reduce this undercooling by reducing the pressure in the freezer, such reduction of pressure has a limiting effect upon the vaporization rate, and consequently, upon the rate of ice production, and therefore, is not desirable.

Moreover, a rapid motion of the droplets of refrigerant through the brine tends to effect an undercooling of these droplets by the hydrodynamic Bernouli effect, causing thereby the static pressure of the surface of the droplets to be reduced by virtue of their velocity in accordance with the relation:

$$\Delta h = V^2/2g$$

where $\Delta h$ is the reduction in pressure in feet of water (or brine) pressure, $V$ is the velocity of the droplets in feet per second and $g$ is 32.2 ft./(sec.)$^2$, the acceleration of gravity. Inasmuch as the velocity of the droplets of refrigerant in an agitated mixture of brine, ice and refrigerant may be of the order of several feet per second, the pressure reduction produced by this effect may be of the order of 30 mm. of mercury, which for a refrigerant evaporating in the vicinity of normal atmospheric pressure, may result in undercooling by about two degrees Fahrenheit. In the case of very intensive agitation in the reactor, the velocity of the droplets may exceed ten feet per second and the degree of undercooling may be consequently greater than two degrees.

The tendency of the refrigerant droplets to undercool is responsible for a metastable condition at the droplet interfaces which results in the formation of ice crystal nuclei. The size of the crystals of ice is determined by the number of nuclei. Each crystal starts as a nucleus and then grows to its final size. The more nuclei, the finer the crystal size. This nucleating condition leads to the formation of fine ice crystals which are handled and separated from the adhering brine only with difficulty and at some expense.

A further object of the present invention is to provide a new and improved water extraction freezer process, in which the formation of a large number of ice crystal nuclei is precluded or substantially reduced despite the effect of vapor flash and in which the formation of crystals of relatively large and uniform size is consequently promoted.

I have discovered in accordance with the present invention that ice crystal nucleation is substantially reduced or avoided when the refrigerant consists at least of two components, namely a clathrate-former and one which is incapable of clathrate formation under the conditions prevailing in the freezer or reactor. By "clathrate-former" is meant a substance which is capable of forming a clathrate or inclusion compound with water. A clathrate is a crystalline substance in which molecules of clathrate-former are surrounded by water molecules and are thereby occluded. Clathrates are sometimes called "gas hydrates." Clathrate formation depends primarily upon the size and shape of the clathrate-former molecules rather than upon chemical properties.

The clathrate-former should be the less volatile of the refrigerant components, so that the concentration of this clathrate-former in the liquid refrigerant being partially evaporated increases. Preferably, although not necessarily, the mixture of the two components in the refrigerant should be one which approximates an azeotropic mixture, so that the ranges of temperature during vaporization and during condensation are narrow. This latter requirement is based mainly on the desirability of minimizing the energy required to compress the vapor.

Among the substances which are clathrate-formers are the following: carbon dioxide, ethylene, ethane, propane, chlorine, hydrogen sulfide, nitrous oxide, methyl fluoride, methyl chloride, methyl bromide, sulfur dioxide, methylene fluoride, ethylene, acetylene, bromine, trifluoromethane, carbon tetrafluoride, ethyl fluoride, ethylidene difluoride, methylene chloride, chloroform, carbon tetrachloride, methyl iodide, ethyl chloride, 1,1,1 trifluoroethane, ethylidene dichloride, difluorobromomethane, trifluorochloromethane, difluorodichloromethane, trichlorofluoromethane dibromochlorofluoromethane, difluorochlorobromomethane, trifluoroiodomethane, cyclopentene and vinyl chloride.

Among the substances which are non-clathrate formers are propylene, cyclopropane, methyl acetylene, dimethyl ether, octafluorocyclobutane decafluorobutane, n-butane, butene-1, and butadiene.

In the practice of this invention, it is possible to employ a clathrate-former which consists of any one or more of the substances selected from group one with a non-clathrate former which consists of any one or more of the substances selected from group two. It is desirable, however, that the substance or mixture thereof selected from group two of non-clathrate formers be more volatile than that of group one, so that a vapor from a mixture of clathrate former and non-clathrate former be richer in the component derived from group two. Generally, the volatility is indicated by the normal boiling point and it is likely that a substance having a lower point is the more volatile component in the mixture.

The principle of the invention is illustrated in conjunction with ethyl chloride as the clathrate-former and n-butane as the compound incapable of clathrate formation, but it must be understood that with any other suitable clathrate-former and non-clathrate former, the principle would be the same.

Assuming that a freezer or reactor vessel is filled to the operating level with sea water, and assuming that ethyl chloride, n-butane or a mixture thereof is injected as the refrigerant under agitation into the sea water, evaporation of the refrigerant causes the temperature of the sea water to fall. This continues until a solid phase appears. It is also assumed that the refrigerant is then compressed and recondensed, the condensate being recycled.

Where the ethyl chloride or n-butane alone is employed, the solid phase which appears as described, will be either ice or ethyl chloride hydrate, depending on whether the refrigerant is ethyl chloride or n-butane. Where these refrigerants are employed as a mixture in a certain ratio, both of these solid phases are produced in the freezer. Hereinafter, I will call the composition of this equilibrium mixture at which the appearance of both of these solid phases occur the "critical composition." When this mixture contains more ethyl chloride than is required for a critical composition, then only ethyl chloride hydrate appears; when this mixture contains less ethyl chloride than is required for a critical composition, then only ice appears. If the composition of the refrigerant mixture is hypercritical with respect to the ethyl chloride (i.e. the mixture contains more ethyl chloride than the critical concentration), the formation of the ethyl chloride hydrate leads to a reduction in concentration of ethyl chloride in the refrigerant solution. This continues with recycling, until the critical composition is approached. At this point, further formation of ethyl chloride hydrate ceases.

Similarly, if the magma in the freezer or reactor contains some ethyl chloride hydrate, circulation of a refrigerant mixture which is hypocritical with respect to the ethyl chloride (i.e. the mixture contains less ethyl chloride than the critical concentration) leads to gradual enrichment of the mixture with ethyl chloride until the critical composition is approached, assuming that the supply of the clathrate is not exhausted before reaching this point.

In practicing my invention, I recycle the refrigerant vapor after compression and cooling, as described. Sea water enters the freezer continuously and a magma of ice crystals and brine leaves the freezer carrying little or none of the refrigerant. The latent heats are such that from 0.84 to1 or slightly more pounds of refrigerant must be evaporated for each pound of ice produced. Each pound of water which is combined in clathrate formation requires the absorption of 0.27 pound of ethyl chloride from the liquid and each pound of water in the form of hydrate dissolved releases a like amount of ethyl chloride to enrich the stream of refrigerant. Within the limitations of these ratios, the phase diagram of the system water-ethyl chloride-butane and the liquid-vapor equilibrium diagram of ethyl chloride-butane system, it is possible to compute the equilibrium phase relations in an adiabatic system at the point of entrance of the refrigerant and also at the point of evaporation and at various stages to complete evaporation. From the phase diagram described, it has been determined that the critical composition of the refrigerant mixture is slightly above 26% of ethyl chloride.

As described, under non-equilibrium conditions, because of undercooling due to rapid vaporization of refrigerant droplets, it is possible to depart considerably from equilibrium or critical composition by formation of clathrate, which is disseminated throughout the freezer contents and gradually dissolved with the simultaneous formation of ice crystals. Consequently, I have found that it is possible to carry out the invention under a range of refrigerant composition inasmuch as the metastable formation of clathrate is a factor in avoiding ice nucleation even when the composition of the refrigerant is somewhat leaner than 26% in ethyl chloride.

In the preferred embodiment of the invention, I employ a liquid refrigerant feed into the freezer which is just barely below the critical composition and maintain within the freezer an inventory of "heel" of clathrate in addition to one of ice crystals. Where the two solid phases are present together, the liquid refrigerant tends to become enriched to approximately 32% ethyl chloride and produces a vapor at about 26% going to compression.

The operation of the system is desirably started with a mixture of clathrate-former and non-clathrate former with an excess of clathrate-former over that required for a critical composition, and fresh mixture is fed into the freezer or reactor having a leaner amount of clathrate-former or fresh non-clathrate former alone is fed into the freezer, the ratio between the components of the fresh mixture being varied and the fresh refrigerant feed being continued until no clathrate comes out of the freezer. This brings the refrigerant mixture to the desirable proportions just below the critical composition to discharge substantially only ice crystal and brine from the freezer. Operation is continued on this basis.

I have found that when the process is carried out in accordance with the present invention, by employing a refrigerant mixture containing ethyl chloride or any other suitable clathrate-former and n-butane or any other suitable compound incapable of forming a clathrate in the freezer, the magma or output of the freezer or reactor contains well-formed ice crystals of a size which is desirable for easy and effective separation from the adhering brines. Although with n-butane alone, the ice crystals tend to be extremely fine in the form of snow and consequently hard to separate from the brine in a centrifuge, as for example, of the perforated basket type, the combination of the n-butane with ethyl chloride produces coarse ice crystals with no special care or precautions, after the refrigerant has attained close to critical composition. It is, therefore, surprising that the use in the refrigerant of a comparatively small percentage of ethyl chloride, as for example, 26%, has the effect, when used in admixture with n-butane, of inhibiting ice crystal nucleation and of causing the ice crystals formed to be of coarse substantially uniform size.

The use of ethyl chloride alone as the refrigerant is not as effective as the use of the refrigerant mixture described for ice formation, owing to its relatively low vapor pressure at refrigeration temperature and owing to its propensity to form the hydrate rather than ice. The combination of ethyl chloride with n-butane produces an effect which cannot be anticipated from the known behavior of the components individually.

The invention is illustrated in connection with an embodiment described in the following description and shown in the accompanying drawings, in which FIG. 1 is a diagrammatic view of an apparatus, shown in the form of a flow sheet, which can be employed to carry out the water extraction process of the present invention; and FIG. 2 is a vertical section, somewhat diagrammatic of the freezer or reactor forming part of the apparatus of FIG. 1.

The apparatus shown in the drawings herein is described in connection with the desalination of brine, although it must be understood that as far as certain aspects of the invention are concerned, the invention is applicable to the extraction of water in any aqueous solution.

Also, although as far as certain aspects of the invention are concerned, the process of the present invention may be conducted in various types of equipment, it is advisable to employ a freezer or reactor 10, in which the refrigerant as well as the magma from said freezer are recycled by agitation or by pumping, so that the refrigerant droplets rise in the freezer and partially evaporate at the top before being returned to the bottom and distributed for further contact with the aqueous phase. It is advantageous to conduct the process of the present invention in a freezer in which the contents are circulated by an orderly motion which induces a downward flow of magma and liquid refrigerant in one region and an upward flow of this magma and liquid refrigerant in another. By this means, the refrigerant droplets alternate in position and in velocity in a periodic exchange which tends to promote the type of transformation in which comparatively large ice crystals are formed by the refrigeration obtained by the dissolution of an intermediate clathrate phase.

Also, although it is possible to carry out the process of the present invention in a freezer having a single compartment, it is preferred to employ one having multiple compartments to effect a counter-current flow of the refrigerant and the aqueous solution and crystals. The compartment which receives the refrigerant and which discharges the brine and ice must contain a minimum of the clathrate, while the other compartment in which vaporization of the refrigerant is completed should contain a significant amount of clathrate inventory.

Referring to the drawings, the freezer 10 is divided into an upper compartment 11 and a lower compartment 12 by a horizontal partition 13. Brine in the form of sea water, or any other aqueous solution from which the water is to be extracted enters the top of the upper compartment 11 by means of an inlet 14 and liquid refrigerant containing the clathrate-former and the substance incapable of clathrate formation is fed into the lower compartment 12 through an inlet 15. An outlet 16 at the bottom of the lower compartment 12 discharges the magma consisting essentially of the ice and brine.

Secured to the partition 13 and passing therethrough are nozzles 17 distributed substantially uniformly over the area of the partition and serving to inject by jet action the refrigerant from the lower compartment 12 into the upper compartment 11. A down-take pipe 18 between the two compartments 11 and 12 causes the mixture in the upper compartment 11 to overflow into the lower compartment 12. Refrigerant vapor leaves the upper compartment 11 through a pipe 20 and is conducted to a compressor, as will be more fully described.

In order to effect smooth streamline controlled circulation of the magma in the lower compartment 12, there is provided a pair of conical vaned circulators 21 and 22, each shown comprising a spider frame 23, which is secured to a central upright drive shaft 24, suitably journalled in bearings and carrying a series of vanes 26 arranged around said frame. In order to induce flow through the circulators 21 and 22, the frames 23 thereof are of generally conical form and the two frames taper in opposite directions, so as to slope the vanes 26 correspondingly with respect to the axis of the circulators. Since the sloping of the vanes 26 causes different sections of said vanes therealong to rotate at linear speeds varying according to their distance from the axis, this differential in speed induces flow of the fluids through the circulators in the directions shown in the drawings. The flow is a smooth controlled one, almost akin to one resulting from pumping action to produce the conditions described in which there is induced a downward flow of magma and liquid refrigerant in one region and an upward flow in another.

In the operation of the freezer 10, the brine introduced into the upper compartment 11 through the inlet 14 comes in contact with the refrigerant vapors in said compartment and through the liquid refrigerant injected into the upper compartment through the nozzles 17. The refrigerant vapors leave through the pipe 20 and there is formed in the upper compartment 11, in addition, a mixture consisting essentially of water, salt, clathrate and liquid refrigerant, which overflows through the pipe 18 into the lower compartment 12. Into this lower compartment 12, there is fed fresh refrigerant through the pipe 15. The intimate contact in the lower compartment 12 between the brine, the clathrate, and the refrigerant converts almost all of the clathrate into ice, and there is formed in the lower compartment a body consisting essentially of ice, salt and water and a top layer next to the partition 13 consisting essentially of liquid refrigerant, which is injected into the upper compartment 11 through the nozzles 17.

Referring to the entire continuous desalination system, the brine in the form of sea water flows by means of a pipe 35 through a heat exchanger 36, where it flows in heat exchange relationship with the extracted or product water delivered through a pipe 37 and with the brine separated from the ice crystals in a centrifuge 38 and delivered through a pipe 39. In this manner, the sea water is precooled to a temperature close to or below the freezing point of water. The sea water so precooled, is delivered to the freezer 10 through the inlet 14. The magma of ice crystals and brine is discharged from the freezer 10 through the outlet 16, and delivered to the centrifuge 38, where the ice crystals are separated from the brine, and the separated brine is delivered to the heat exchanger 36 through the pipe 39 as described, and the separated ice is delivered by a pipe 40 to a condenser-melter unit 41.

The refrigerant vapor discharged from the upper compartment 11 of the freezer 10 through the pipe 20 is compressed in a primary compressor 42, and the compressed vapors therefrom are delivered by a pipe 43 to the condenser-melter unit 41 where the compressed vapors flow into heat exchange relationship with the separated ice delivered thereto by the pipe 40. In the condenser-melter unit 41, the vapors are condensed, while the separated ice is melted to form extracted product water. The product water is discharged from the condenser-melter unit 41 through the pipe 37 for delivery to the heat exchanger 36, and is discharged from said heat exchanger through a pipe 45. The condensed refrigerant is discharged in liquid form from the condenser-melter unit 41 through a pipe 46 and is delivered to the inlet 15 of the lower compartment 12 of the freezer 10.

Inasmuch as the process does not produce enough ice to condense all of the vapor discharged from the primary compressor 42, a portion of this vapor is delivered by a pipe 47 to a secondary compressor 48, where it is further compressed and delivered by a pipe 50 to a condenser 51. In this condenser 51, the vapor is condensed by ambient water delivered thereto by a pipe 52 and delivered therefrom by pipe 53. The condensed liquid refrigerant obtained from the condenser 51 must be cooled before delivery to the freezer 10, and for that purpose, this liquid refrigerant is delivered by a pipe 54 to a flash drum 55, where it vaporizes by self-evaporation sufficiently to form a cool liquid body of liquid refrigerant which is delivered by a pipe 56 to the pipe 46 where it merges with the liquid refrigerant discharged from the condenser-melter unit 41 for delivery to the freezer 10. The vapors from the flash drum 55 are added to part of the vapors from the primary compressor 42 for delivery to the secondary compressor 48 by means of a pipe 57 for recompression therein and for recondensation in the condenser 51.

The product or extracted water after being employed to precool the sea water in the heat exchanger 36 is delivered from the exchanger through the pipe 45 for use wherever it is needed, and the separated brine after being also employed to precool the sea water in the heat exchanger is discharged from the exchanger through a pipe 58 and may go to waste or be utilized as needed.

The following example illustrates a certain way in which the principles of the invention can be applied but it is not to be construed as limiting the broader aspects of the invention.

*Example*

Sea water is precooled in the heat exchanger 36 to a temperature of 30° F. and is delivered continuously at this temperature to the freezer or reactor 10 through the pipe 14 at a rate of 75 pounds per hour. Simultaneously, a liquid refrigerant containing 26% ethyl chloride and 74% n-butane precooled to 33° F. is caused to flow into the freezer 10 through the pipe 15 at a rate of 33.7 pounds per hour. After a steady state has been achieved, vapor at 15.9 pounds per square inch absolute leaves the freezer 10 through the pipe 20. The rate and composition of this emerging vapor corresponds to the rate and composition of the entering stream of ethyl chloride and n-butane. Part of this vapor is compressed to 19.4 pounds per square inch absolute in the primary compressor 42 and in compressed form is condensed in the condenser-melter unit 41.

A magma of ice and concentrated brine leaves the freezer 10 under steady state conditions through the pipe 16 at 75 pounds per hour, which corresponds to the rate at which the sea water enters said freezer. This magma consisting of 34.7 pounds per hour of ice and 40.3 pounds per hour of brine, is separated into its liquid and solid components in the centrifuge 38. The separated ice is in the form of ice crystals of 16 mesh and these crystals are melted into product water in the condenser-melter unit 41, its latent heat absorbing capacity being utilized to condense the compressed vapors from the freezer 10.

The liquid refrigerant and clathrate-formed condensate mixture is returned to the freezer 10 in the manner described to complete the cycle.

Inasmuch as there is available from the process an amount of ice which is sufficient to condense no more than 85% of the vapor from the freezer 10, the remaining 15% of this vapor is further compressed to 60 pounds per square inch absolute in the secondary compressor 48 and the vapor so compressed is condensed in the condenser 51 by ambient cooling water. The condensate obtained following the secondary compression and condensation is combined with the initial condensate derived from the condenser-melter unit 41. However, this secondary condensate is warm and it is desirable to cool it in the flash drum 55 before admixture therewith, so that it will cool the primary condensate. The vapor leaves the flash drum 55 through the pipe 56 for recirculation through the secondary compressor 48 and the condenser 51.

While the invention has been described with particular reference to specific embodiments, it is to be understood that it is not to be limited thereto but is to be construed broadly and restricted solely by the scope of the appended claims.

What is claimed is:

1. The method of concentrating an aqueous solution of a material, comprising intimately contacting the solution with a boiling liquid refrigerant mixture to produce therewith a system, one refrigerant component of said mixture being a clathrate-former and another refrigerant component being a non-clathrate former to produce ice crystals in said system, said components being so proportioned that in the system, said components are substantially in equilibrium with the ice crystals, clathrate formed from said clathrate-former and an aqueous solution of said material.

2. The method of extracting water from an aqueous solution of a material comprising intimately contacting the solution with a boiling liquid refrigerant mixture to produce therewith a system, one refrigerant component of said mixture being a clathrate-former and another refrigerant component being a non-clathrate former to produce ice crystals in said system, said components being so proportioned that in the system, said components are substantially in equilibrium with the ice crystals, clathrate formed from said clathrate-former and an aqueous solution of said material, and separating said ice crystals from the latter aqueous solution.

3. The method as described in claim 2, wherein the proportions of the liquid refrigerant components are such as to bring the system just below equilibrium in which said system consists solely of said refrigerant components, ice crystals and an aqueous solution of said material.

4. The method as described in claim 2, wherein said clathrate-former is less volatile than said non-clathrate former.

5. The method as described in claim 2, wherein the vapors resulting from the evaporation of said liquid refrigerant mixture are continuously converted into liquid form and continuously recycled into contact with fresh aqueous solution of said material.

6. The method as described in claim 4, wherein the vapors resulting from the evaporation of said liquid refrigerant mixture are converted into liquid form by compressing the vapors and passing the compressed vapors in heat exchange relation with the ice crystals formed.

7. The continuous method of extracting water from an aqueous solution of a material, comprising evaporating a mixture of liquid refrigerants in a freezer while in intimate contact with said aqueous solution to form in said freezer a system with said aqueous solution, said mixture containing a clathrate-former refrigerant and a non-clathrate former refrigerant to produce ice crystals in said solution in said freezer, said refrigerants being so proportioned that in said system, said refrigerants are substantially in equilibrium with the ice crystals, clathrate formed from said clathrate-former and an aqueous solution of said material, separating the ice crystals from the latter aqueous solution, feeding continuously fresh aqueous solution into said freezer, discharging vapors resulting from the evaporation of said refrigerants from said freezer and subjecting said vapors to compression and condensation by cooling through heat exchange with separated ice crystals to liquefy the vapors, and recycling the liquefied vapors continuously into said freezer into intimate contact with the aqueous solution in said freezer.

8. The method as described in claim 2, wherein the aqueous solution from which the water is extracted is sea water.

9. The method as described in claim 2, wherein the clathrate-former refrigerant is of the class consisting of carbon dioxide, ethylene, ethane, propane, chlorine, hydrogen sulfide, nitrous oxide, methyl fluoride, methyl chloride, methyl bromide, sulfur dioxide, methylene fluoride, ethylene, acetylene, bromine, trifluoromethane, carbon tetrafluoride, ethyl fluoride, ethylidene difluoride, methylene chloride, chloroform, carbon tetrachloride, methyl iodide, ethyl chloride, 1,1,1-trifluoroethane, ethylidene dichloride, difluorobromomethane, trifluorochloromethane, difluorodichloromethane, trichlorofluoromethane, dibromochlorofluoromethane, difluorochlorobromomethane, trifluoroiodomethane, cyclopentene and vinyl chloride.

10. The method as described in claim 2, wherein the non-clathrate former refrigerant is of the class consisting of propylene, cyclopropane, methyl acetylene, dimethyl ether, octafluorocyclobutane, decafluorobutane, n-butane, butene-1, and butadiene.

11. The method as described in claim 9, wherein the non-clathrate former refrigerant is of the class consisting of propylene, cyclopropane, methyl acetylene, dimethyl ether, octafluorocyclobutane, decafluorobutane, n-butane, butene-1 and butadiene.

References Cited by the Examiner
UNITED STATES PATENTS 3,214,371  10/1965  Tuwiner _____ 210—60

MORRIS O. WOLK, *Primary Examiner.*
E. G. WHITBY, *Assistant Examiner.*